United States Patent [19]

Demopoulos

[11] Patent Number: 4,571,946
[45] Date of Patent: Feb. 25, 1986

[54] INTERNAL COMBUSTION ENGINE WITH RANKINE BOTTOMING CYCLE

[76] Inventor: Andreas Demopoulos, Marathias Doridos, Nomos Phokidos, Greece

[21] Appl. No.: 639,941

[22] Filed: Aug. 13, 1984

[30] Foreign Application Priority Data

Aug. 15, 1983 [GB] United Kingdom ............... 8321910

[51] Int. Cl.[4] ............................................. F01K 23/10
[52] U.S. Cl. ................................... 60/618; 123/58 AB
[58] Field of Search ............ 60/616, 618; 123/43 AA, 123/58 AB, 58 AA, 58 AM

[56] References Cited

U.S. PATENT DOCUMENTS

| | | | |
|---|---|---|---|
| 1,569,525 | 1/1926 | Owens | 123/43 AA X |
| 1,570,902 | 1/1926 | Looney | 123/58 AB X |
| 1,614,476 | 1/1927 | Hutchinson | 123/43 AA |
| 3,687,117 | 8/1972 | Panariti | 123/58 AA X |
| 3,851,630 | 12/1974 | Foster | 60/618 X |
| 4,084,555 | 4/1978 | Outlaw | 123/58 AB X |
| 4,149,498 | 4/1979 | Ferrell | 123/58 AA |

FOREIGN PATENT DOCUMENTS 2935383  3/1981  Fed. Rep. of Germany ........ 60/616

*Primary Examiner*—Michael Koczo
*Attorney, Agent, or Firm*—Steele, Gould & Fried

[57] ABSTRACT

A barrel-type internal combustion engine 1 has double-ended pistons 10 reciprocally movable within cylinders 2 disposed in a ring about a central axis 3. The pistons 10 are interconnected with a central drive member 16, by means of a cam 17 carried by the drive member 16, whereby reciprocatory movement of the pistons causes the drive member to rotate. A closed circuit pressurized vapor system which makes use of waste engine heat, includes an expander 110, enabling mechanical energy obtained from expansion to be applied to the rotary member 16, to augment the power generated by the pistons 10. The expander 110 is formed by a hollow interior 31 in the rotary member 16, which houses a shaft 37, the shaft 37 defining with the member 16 an annular chamber 42. The rotary member 16 and shaft 37 rotate eccentrically relative to each other and in the same direction. Sealing components 32, 35 cooperate so as to divide the chamber 42 into relatively high and low pressurized vapor zones as the drive member 16 and shaft 37 rotate eccentrically.

10 Claims, 19 Drawing Figures

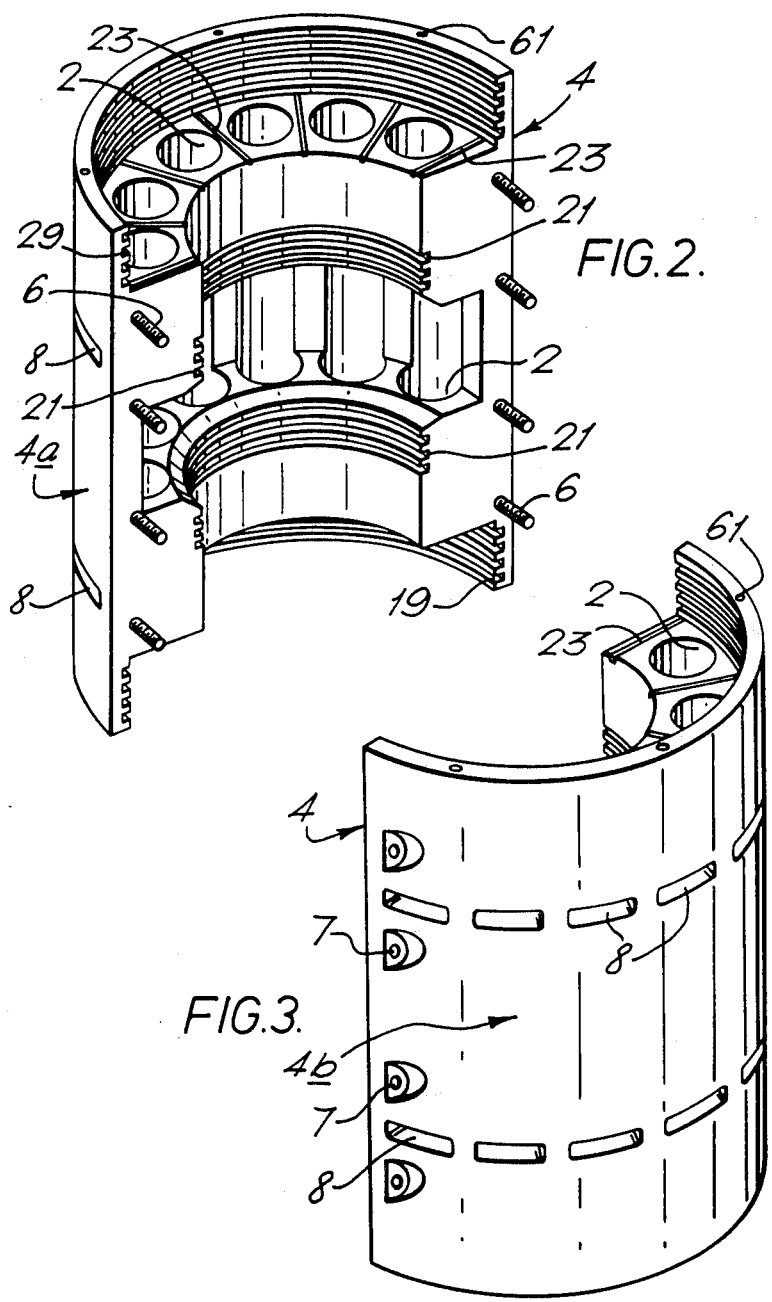

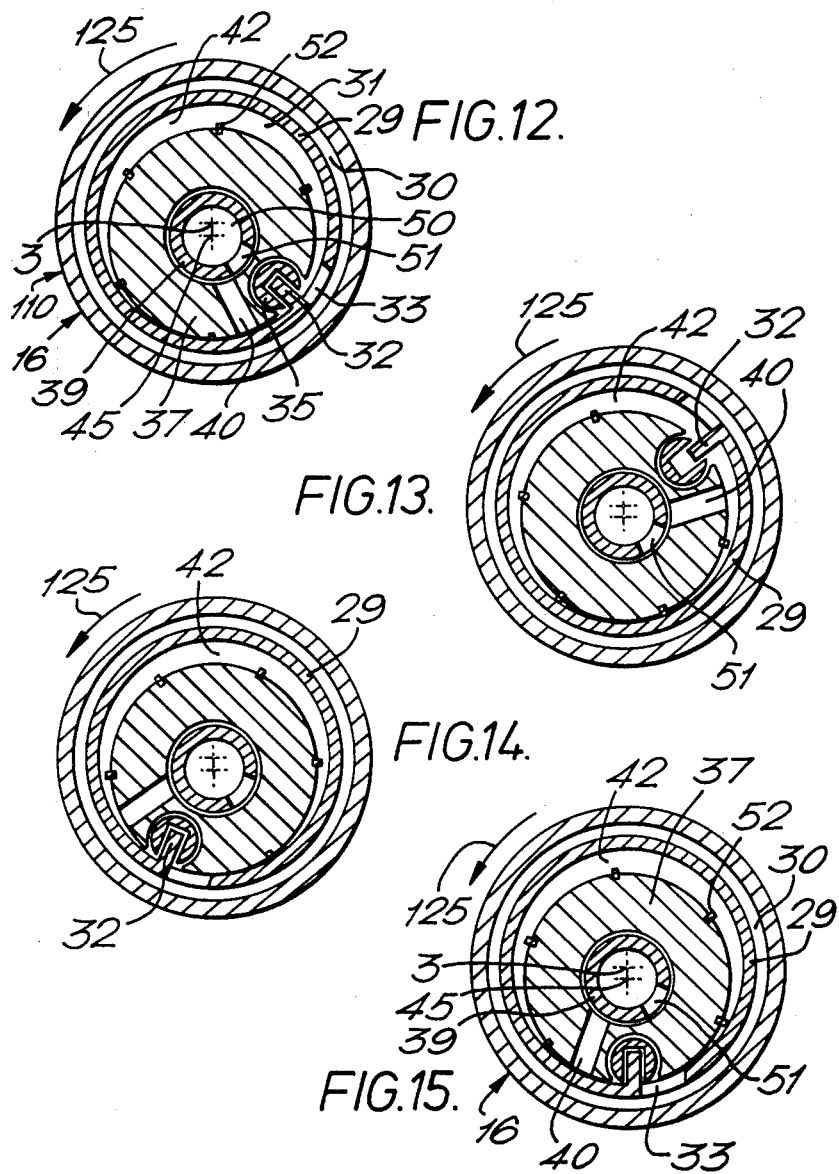

ment, and having a port which, when aligned with said cylinder end, allows air to flow through the port and into the cylinder. The piston may comprise a double-acting piston and two such ported members may be provided, one at each end of the cylinder. The piston may be interconnected with a rotary member by cam means carried by the rotary member, whereby rotation of the rotary member causes the piston to reciprocate, the ported members being carried by the rotary member, so as to rotate therewith.

INTERNAL COMBUSTION ENGINE WITH RANKINE BOTTOMING CYCLE

BACKGROUND TO THE INVENTION

This invention relates to engines.

The invention is primarily concerned with internal combustion engines. However, it will be clear from the present disclosures that the internal combustion engine described and illustrated herein may be adapted for use as a compressor. Accordingly, as used herein, the term "engine" is not necessarily confined to internal combustion engines and may, on occasions, include compressors.

SUMMARIES OF THE INVENTION

According to one aspect of the invention, an internal combustion engine has at least one piston reciprocally movable within a cylinder, and provided with means for causing the piston to dwell at one end of its stroke. The piston may be caused to dwell at both ends of its stroke, where the periods of dwell may be equal or non-equal.

According to another aspect of the invention, an internal combustion engine comprises a stationary cylinder, a piston reciprocally movable within the cylinder, and means for introducing a metered supply of combustible fluid into the cylinder, so that combustion can take place, said means comprising a fuel-supply member movable relative to the cylinder and in a plane disposed substantially normal to the path of piston movement, whereby the combustible fluid is introduced into the cylinder in a controlled manner as the member traverses said cylinder.

The piston may comprise a double-acting piston, and two such movable members may then be provided, one at each end of the cylinder.

According to yet another aspect of the invention, an internal combustion engine comprises at least one piston reciprocally movable within a cylinder and interconnected with a rotary member of hollow form by cam means carried by the rotary member, whereby reciprocatory movement of the piston causes rotation of the rotary member, and auxiliary means for augmenting rotation of the rotary member, said auxiliary means comprising a closed circuit pressurised vapour system including an expander disposed within the hollow rotary member and interconnected therewith, whereby mechanical energy obtained from expansion of the vapour in the expander is applied to the rotary member.

The interior of the hollow rotary member preferably comprises part of the vapour expander.

The hollow rotary member may house a shaft which defines with the rotary member a chamber of annular form, means whereby the hollow rotary member and the shaft disposed therein rotate eccentrically relative to each other about substantially parallel axes, and in the same direction, and sealing means cooperating with the rotary member and the shaft so as to divide the chamber into relatively high and low pressure zones as the rotary member and the shaft rotate eccentrically.

According to a further aspect of the invention, a compressor form of the engine comprises a stationary cylinder, a piston reciprocally movable within the cylinder, and air control means for controlling a flow of air to be compressed into one end of the cylinder, said means comprising a member, movable in a plane disposed substantially normal to the path of piston move-

BRIEF DESCRIPTION OF THE DRAWINGS

An embodiment of the invention will now be described by way of example only, with reference to the accompanying drawings, wherein:

FIGS. 12, 13, 14 and 15 illustrate operation of a vapour expander portion of the engine.

In the figures, like reference numerals refers to like components.

DETAILED DESCRIPTION OF THE PREFERRED EMBODIMENT

Figure 1:
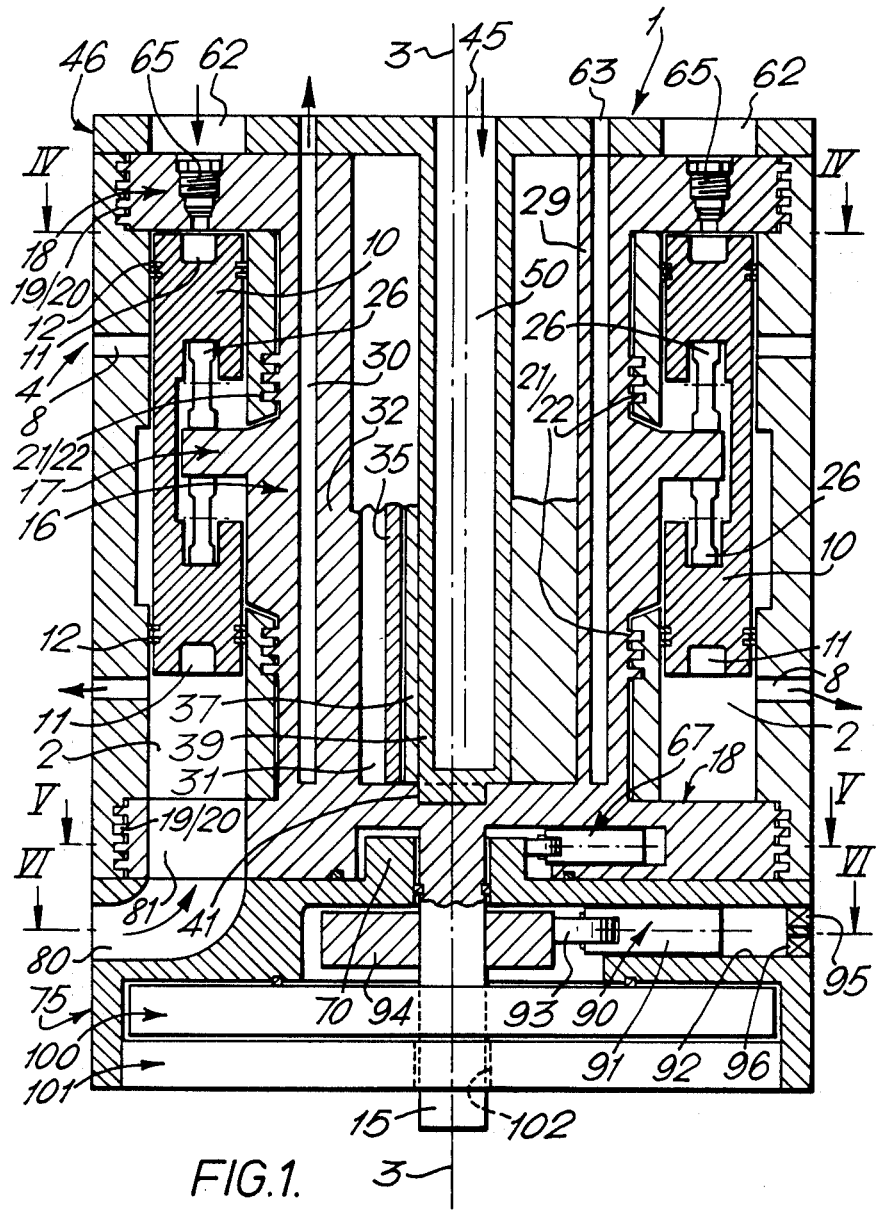
FIG. 1 is a side view, in medial section, of an internal combustion engine, taken on the lines I—I of FIGS. 4, 5 and 6, FIGS. 2 and 3 are views, in perspective, of the two halves of the engine body.

With reference first to FIGS. 1 to 10, particularly FIG. 1, an internal combustion engine 1 of the compression-ignition type, is illustrated thereby.

The engine 1 is a 2-cycle engine, operating on a constant volume, heat addition cycle. The engine 1 also includes means whereby Rankine bottoming compound cycle operation takes place.

As used herein, "constant volume, heat addition" means that a substantial amount of heat is released to the combustion air whilst that air is held at substantially constant volume.

The engine 1 is also of the barrel type, provided with twelve equi-spaced cylinders 2 disposed in a circle, around a central, longitudinal, axis 3. The longitudinal axes of the cylinders 2 are substantially parallel to the axis 3.

Figure 4:
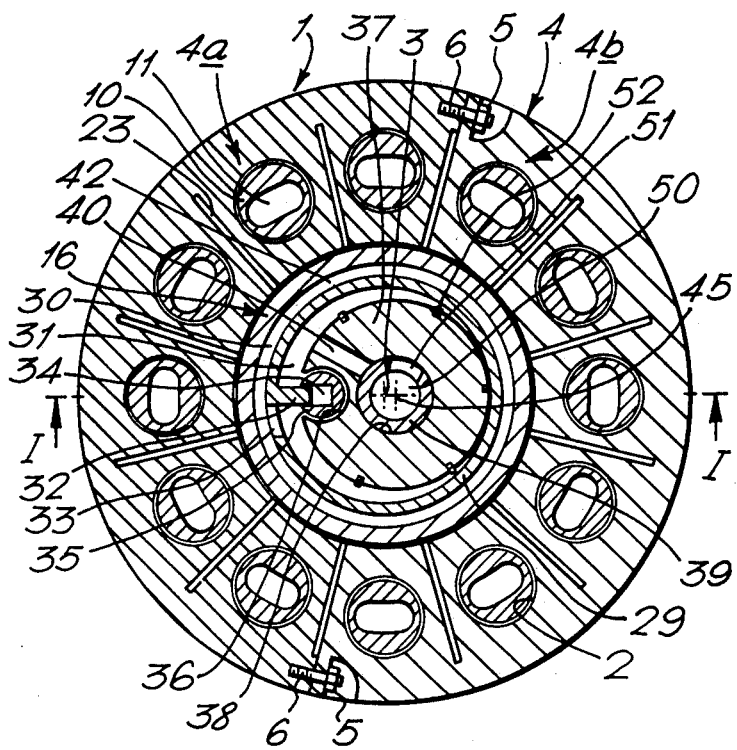
FIGS. 4, 5 and 6 are sections, taken on the lines IV—IV, V—V and VI—VI respectively, of FIG. 1, FIGS. 7, 8, 9 and 10 are views, in perspective, of internal parts of the engine.

The engine body, or block 4, is formed in two sections, namely 4a and 4b, demountably secured together by nut 5 and bolt 6 assemblies as best seen in FIG. 4. The bolts 6 are secured in body section 4a and extend through holes 7 formed in body section 4b. Upper and lower rings of exhaust ports 8 are formed in the body sections 4a and 4b.

The cylinders 2 are formed in the body 4; six cylinders in each body section. Each cylinder 2 locates a piston 10 movble within the cylinder in a reciprocatory manner. The pistons 10 are double-ended; a combustion space 11 being formed in each end. As best seen in FIG. 4, the combustion spaces 11, which are of elongated form in plan view, i.e. when viewed along the path of piston movement, are also arcuate; the common centre of the arcs being disposed on the central axis 3 of the engine 1. The pistons 10 are provided with piston rings 12.

The engine 1 has a central power output shaft 15, the longitudinal axis of which is common with axis 3. The shaft 15 is an integral extension of a rotary drive member 16 of hollow form, best illustrated by FIG. 8.

The rotary member 16 carries an actuating cam 17, disposed between upper and lower cylinder cover plates 18. The rotary member 16 is rotatable within the engine body 4; labyrinth seals are provided by circumferential slots 19, 20 formed in the body 4 and covers 18 respectively. Further labyrinth seals are provided by circumferential slots 21, 22 formed in the body 4 and rotary member 16 respectively. Radially disposed seals 23 (FIGS. 2 and 3) are also provided at opposite ends of the cylinders 2. The arrangement is such that the cylinder cover plates 18 rotate in planes disposed substantially normal to the paths of piston 10 movement.

Each piston 10 is formed with a central, cut-away portion 25 within which is disposed a pair of axially-spaced rollers 26. The rollers 26 of all the pistons 10 bear on the upper and lower surfaces of the cam 17 so that as the pistons 10 reciprocate within their cylinders 2, the cam 17 and hence the rotary member 16 is made to rotate, in order to produce torque at the drive shaft 15.

The cam 17 has a particular profile, described hereinafter, which causes each piston 10 to dwell at opposite ends of its stroke. The dwell is substantially equal at both ends of the stroke. The period of dwell is between 10° and 20° of rotary member 16 rotation.

An annular channel 30 is formed in the rotary member 16. The channel 30 extends around, and is radially spaced from, a central, blind-ended recess 31 of circular cross-section, when viewed in plan. The recess 31 and channel 30 are divided from each other by a sleeve 29 co-axial (and integral) with the rotary member 16. (See also FIG. 18). A rib or vane 32 extends radially inwards, from the wall of the sleeve 29, and also extends longitudinally downwards, for the full depth of the recess 31. A slot 33 is formed in the wall of the sleeve 29, immediately adjacent the vane 32. The slot 33 extends longitudinally alongside the vane 32 and serves as a port providing communication between the recess 31 and channel 30.

The vane 32 extends into a cooperating slot 34 formed in a rod-like seal member 35, which is located, so as to rotate relative thereto, by a slot 36 (FIG. 4) formed in an intermediate shaft 37 which is disposed within the hollow rotary member 16. The shaft 37 has a central, axial, bore 38 which locates a central or inner shaft 39. A longitudinal slot 40 formed in the shaft 37 forms a port allowing communication between the bore 38 and the recess 31. The lower end of the inner shaft 39 is supported by the rotary member 16, through a bearing 41. The intermediate shaft 37 and the sleeve 29 together define an annular chamber 42 (FIGS. 12 to 15). It will be appreciated that, as used herein, the term "annular" is not to be construed in a strict geometrical sense, as the width of the annular chamber 42 is not uniform.

The interfitting elongate vane 32 and associated elongate seal member 35 carried by shaft 37 together form sealing means cooperating with the rotary member 16 and shaft 37 to divide the chamber 42 into relatively high and low pressure zones, as described more fully hereinafter.

The longitudinal axis of the inner shaft 39 is shown at 45. The interfitting vane 32 and seal member 35 extend substantially parallel to the axis 45 and rotate thereabout. The upper end of the inner shaft 39 carries a cover plate 46. The inner shaft 39 is stationary. Intermediate shaft 37 is rotatable about the inner shaft 39, and is driven by the rotary member 16, through the interfitting vane 32 and seal member 35. The axes 3 and 45 are off-set and substantially parallel to each other. As the axis 45 is also the longitudinal axis of the intermediate shaft 37, the shaft 37 is rotatable eccentrically relative to the rotary member 16.

A hollow 50 is formed within the inner shaft 39. An axial slot 51 is formed in the "wall" defined by the hollow 50 and the outer surface of the inner shaft 39.

The outer surface of the intermediate shaft 37 carries radially extending strips 52 (see FIG. 4) located in slots formed in said outer surface. The strips 52, which are free to move radially, within their locating slots, are provided so as to form gas seals between adjacent parts of the intermediate shaft 37 and the wall of the recess 31, as the intermediate shaft 37 rotates.

The cover plate 46 is provided with holes 60 (FIG. 7) alignable with screw-threaded holes 61 (FIGS. 2 and 3) whereby the cover plate 46 can be demountably secured to the engine body 4, using bolts. (Not shown). Arcuate slots 62, 63 formed in the cover plate 46 provide, respectively, air inlet and vapour outlet openings. The vapour outlet openings 63 provide communication with the annular channel 30 formed in the rotary member 16.

Figure 5:
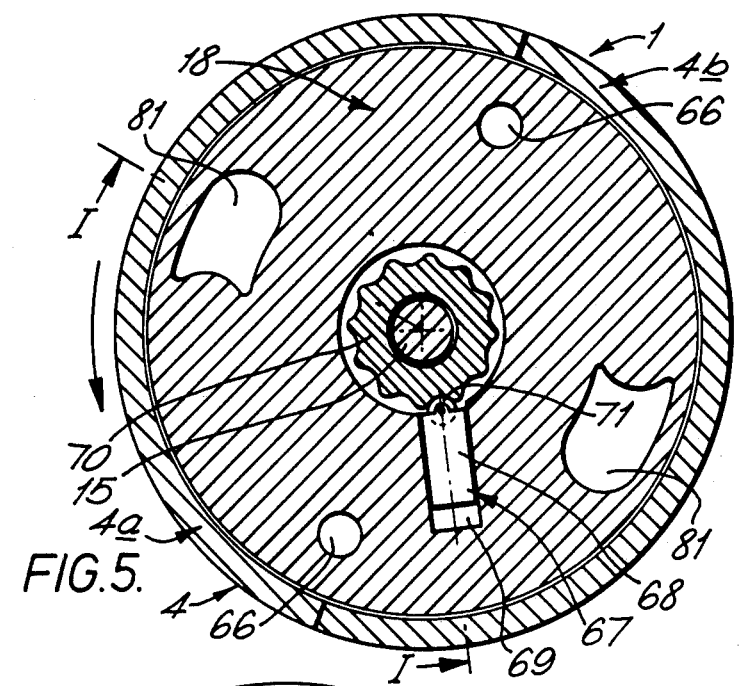
Figure 6:
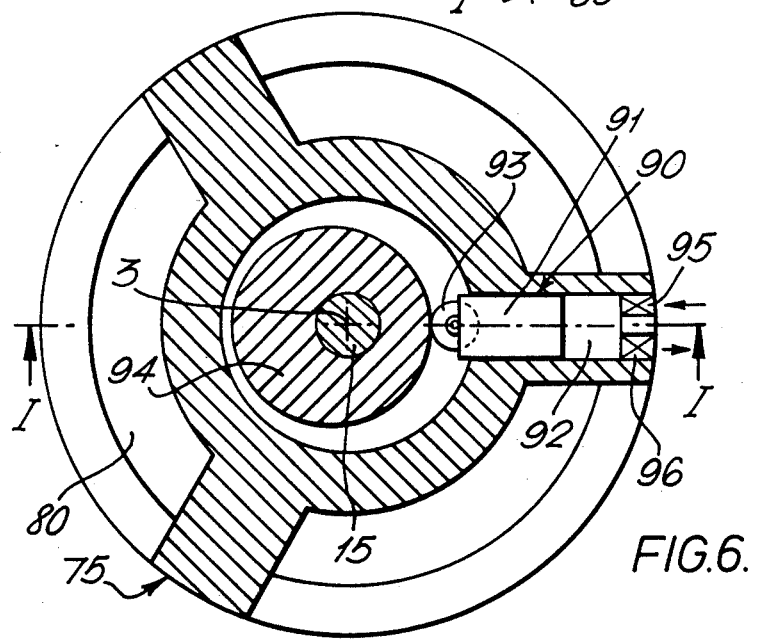
Figure 7:
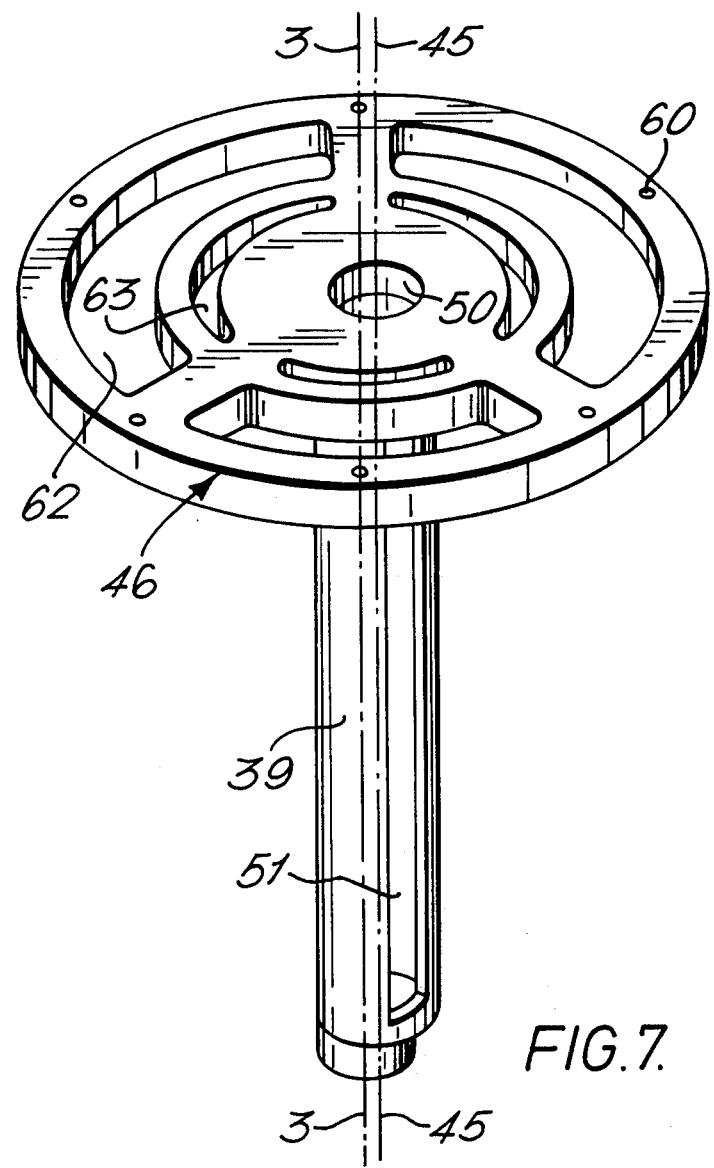
Figure 8:
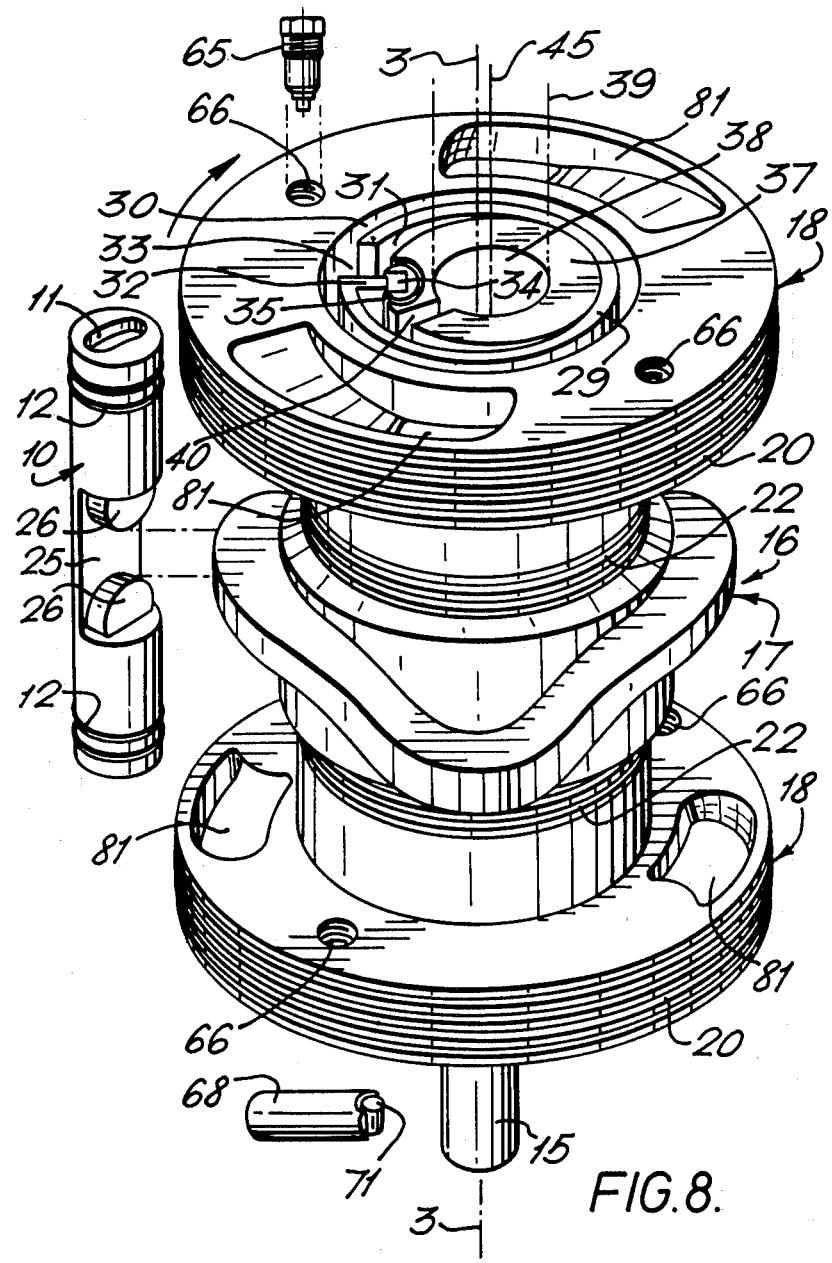

The upper and lower cylinder cover plates 18 each carry a pair of fuel injectors 65, (FIG. 1), disposed in screw-threaded holes 66. (FIGS. 5 and 8). It will be noted that only the fuel injectors 65 of the upper cover 18 are shown in the drawings. The cover plates 18 thus serve as fuel-supply members.

A metered supply of liquid fuel is fed to all four injectors 65 simultaneously by a fuel pump 67 (FIG. 5) comprising a piston 68 reciprocable in a cylinder space 69 formed in the lower cylinder cover plate 18 and operable by a cam 70, which bears on a roller 71 carried by the piston 68.

Figure 9:
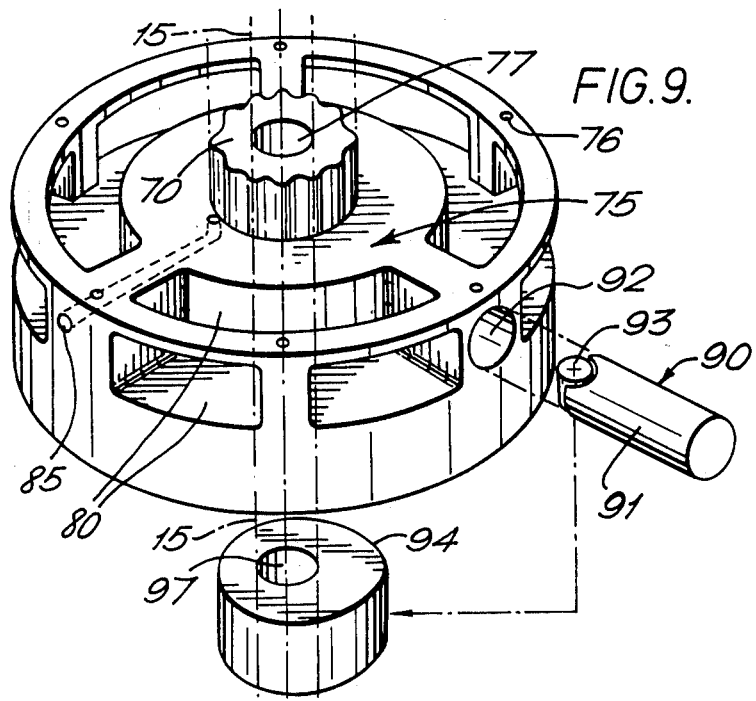

The cam 70 is stationary, and is carried on the upper face of a lower cover plate 75. (FIG. 9). The cover plate 75 is releasably secured to the engine body 4, using bolts, in the same way as cover plate 46 is held in place, holes 76 being formed in the cover plate 75 for this purpose. A central hole 77 is formed in the cover plate 75 to allow free rotation of the drive shaft 15 therein.

Pairs of arcuate ports formed in the periphery of the lower cover plate 75 connect with arcuate slots formed in the upper surface of that plate so as to provide air inlet openings 80. The openings 80 are alignable with air induction ports 81 (FIG. 1) formed in the lower cylinder cover plate 18.

The ports 81, (similar ports 81 (FIG. 8) are formed in the upper cylinder cover plate 18) are shaped to impart swirl to air flowing through the ports 81.

Fuel is supplied to the injection pump 67 by way of a radially-disposed passageway 85 (FIG. 9) formed in the lower cover plate 75. A metered supply of fuel passes from the pump 67 to the fuel injectors 65 by way of internal passageways, (not shown), formed in the rotary member 16.

The lower cover plate 75 houses a feed pump 90 comprising a piston 91 reciprocable in a cylinder space 92. The piston 91 carries a roller 93 which bears against a cam 94 carried by the drive shaft 15, so as to rotate therewith. Non-return inlet (95) and outlet (96) valves (FIG. 1) control flow of fluid to and from the cylinder space 92. The drive shaft 15 is located by a hole 97 formed in the cam 94.

Figure 10:
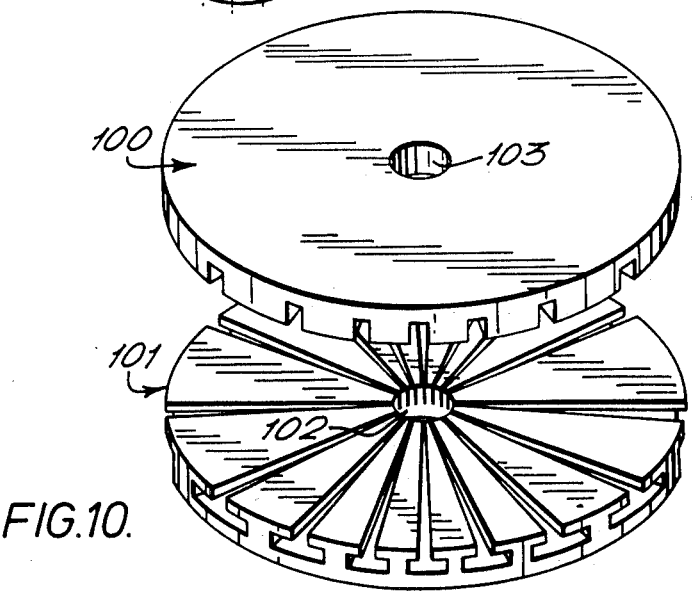

The drive shaft 15 also carries the rotor 100 of a starter-motor alternator. (FIGS. 1 and 10). The stator (101) of the alternator is secured at its periphery to the lower cover plate 75 and is provided with a central hole 102 to allow free rotation of the drive shaft 15 therein. A central hole 103 formed in the rotor 100 locates the drive shaft 15.

Figure 17:
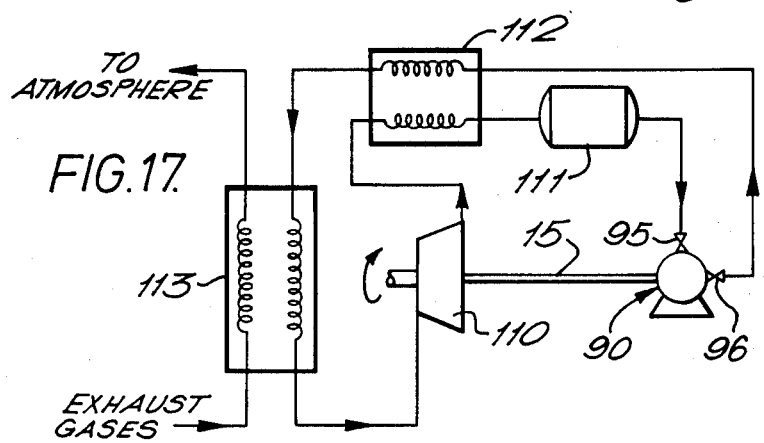
Figure 18:
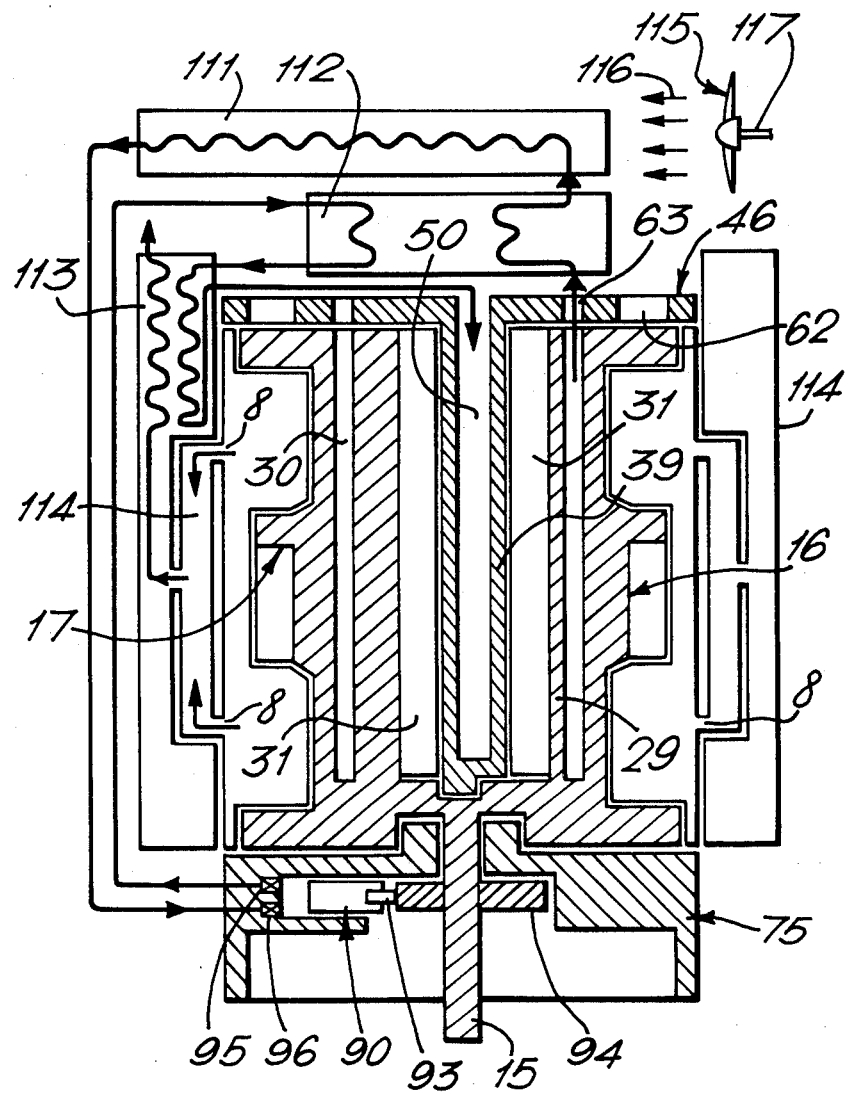

With reference now to FIGS. 17 and 18, the engine 1 is provided with a Rankine Bottoming Compound Cycle Operation System. (The intermediate shaft 37 has been omitted from FIG. 18 for clarity). The cycle enables heat energy present in the engine exhaust gases issuing from the outlet ports 8 (FIG. 1) to be transferred, as mechanical energy, to the rotary member 16.

The system, which in this example employs "FREON" (Registered Trade Mark) as the working fluid, makes use of the feed pump 90, to convey the fluid when in liquid form, an expander, generally indicated by reference numeral 110 and illustrated more particularly in FIGS. 12 to 15, a condenser 111, a regenerator 112, and a vapour generator 113. An annular manifold 114 (FIG. 18) collects exhaust gases issuing from the rings of upper and lower exhaust ports 8. A fan unit 115 is used to blow air over the heat-exchange surfaces of the condenser 111, as indicated by arrows 116. The fan 115 is driven by the engine 1, by way of a shaft 117.

OPERATION OF THE ENGINE

For simplicity the following description is confined to a single piston/cylinder assembly. With first reference to FIG. 11, at stage A, combustion of the air/fuel mixture has been completed and the piston 10 is about to commence its downward, i.e. expansion stroke. The piston 10 is thus at top dead centre. (T.D.C.).

At stage B, expansion has been completed. Continued downward motion of the piston 10 results in the associated exhaust port 8 being uncovered.

At stage C, the piston 10 continues to move downwards. Most of the exhaust port 8 has now been uncovered, and high velocity exhaust gases escaping through the exhaust port create a depression in the cylinder 2. (The Kadency effect).

As mentioned above, reciprocating movement of all twelve pistons 10 cause the rotary member 16 to resolve, by applying rotary forces to the cam 17.

As the rotary member 16 revolves, the unitary upper cylinder cover plate 18 is rotated correspondingly, in the same direction, at the same speed and about a common axis 3. This rotation causes the air inlet port 81 in the plate 18, to begin to expose the top of the cylinder 2 and thus admit combustion air thereto. The cylinder cover plates 18 thus form rotary "shutters".

At stage D, the piston 10 has reached bottom dead centre. (B.D.C.). Exhaust gases continue to flow out of the cylinder 2 by way of the exhaust port 8, drawing fresh air through the air inlet port 81, which has now uncovered a larger portion of the a upper end of the cylinder 2. The piston 10 remains at B.D.C. for substantial period with the exhaust port 8 fully open while scavenging of the exhaust gases takes place. The delay, or dwell, is of the order of 15° of driveshaft 15 rotation.

At stage E, the piston 10 has completed its delay period and begins to move upwards. The air inlet port 81 is now fully open and the top of the cylinder 2 is fully exposed to inflowing air. The exhaust port 8 is still open.

At stage F, the piston 10 continues its upward stroke. The exhaust port 8 has been closed by piston movement but the air inlet port 81 has not yet moved away from the top of the cylinder 2.

At stage G, the rotary cylinder cover plate 18 has now completely covered the top of the cylinder 2. The continuing upward movement of the piston 10 begins to compress air trapped in the cylinder 2.

At stage H, the piston 10 is at T.D.C. Air trapped within the cylinder 2 is compressed to the volume of the combustion chamber 11. (FIG. 1). Another substantial delay, again of the order of 15° of driveshaft rotation, occurs.

The injector 65, which rotates with the cylinder cover plate 18, now begins to inject a metered supply of fuel into the volume of compressed air, as the injector traverses the combustion chamber 11. Injection continues during passage of the injector 65 over the combustion chamber 11.

At stage I, the piston 10 has completed its delay period at T.D.C. Combustion of the air/fuel mixture has taken place, at constant volume, and to a substantial degree. The piston 10 is about to commence its downward, power-generating stroke.

It will be appreciated that the cycle of operation of each cylinder/piston, and at each end of each piston 10, is as described above. The pistons 10 in adjacent cylinders 2 reach T.D.C. in succession as the cam 17 rotates; when a piston 10 is at T.D.C. as regards one end of the cylinder 2, it is at B.D.C. as regards the opposite end of the cylinder 2. It will be understood that the motion of each piston 10 is governed by the profile of the cam 17, which as shown in FIG. 8 is shaped so that each piston 10 undergoes two oscillations for each complete revolution of the cam 17, and so that the dwell period is about 15° (0.52 rad) of cam 17 rotation both at T.D.C. and at B.D.C.

Figure 16:
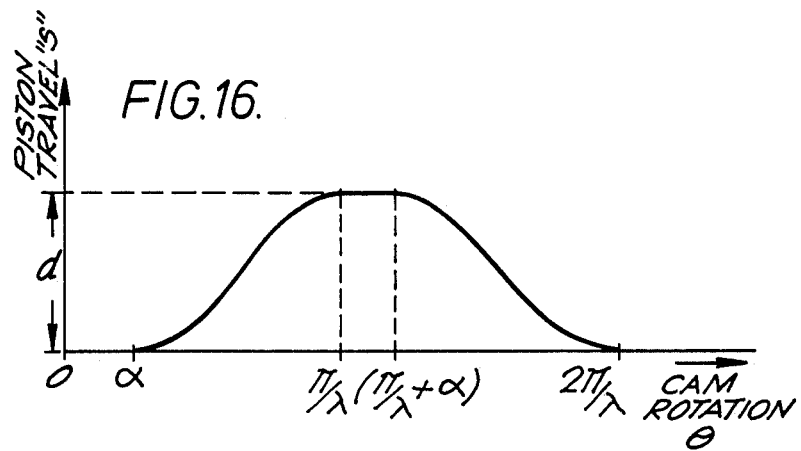
FIG. 16 is a graph illustrating piston dwell, FIGS. 17 and 18 further illustrate the expander portion of the engine, together with a closed circuit pressurised vapour system.

The displacement "S" of a piston is shown in FIG. 16 in relation to the angle of rotation "$\phi$" of the cam, in the case where the dwell period is "$\alpha$" at T.D.C. and B.D.C. The piston displacement "S" is given by the equation:

$$S = (d/2)[1 - \cos \omega] \qquad 1$$

where
$\alpha$ = piston stroke
$\lambda$ = the number of oscillations of the piston in one revolution of the cam (i.e. the number of lobes on the cam)

for $0 \leq \phi \leq \alpha$      $\omega = 0$.

for $\alpha \leq \phi \leq \frac{\pi}{\lambda}$      $\omega = k(\phi - \alpha)$.

for $\frac{\pi}{\lambda} \leq \phi \leq \frac{\pi}{\lambda} + \alpha$      $\omega = \pi$ for $\frac{\pi}{\lambda} + \alpha \leq \phi \leq \frac{2\pi}{\lambda}$      $\omega = k(\phi - 2\alpha)$.

in which:

$$k = \frac{\pi\lambda}{\pi - \alpha\lambda}$$

Figure 19:
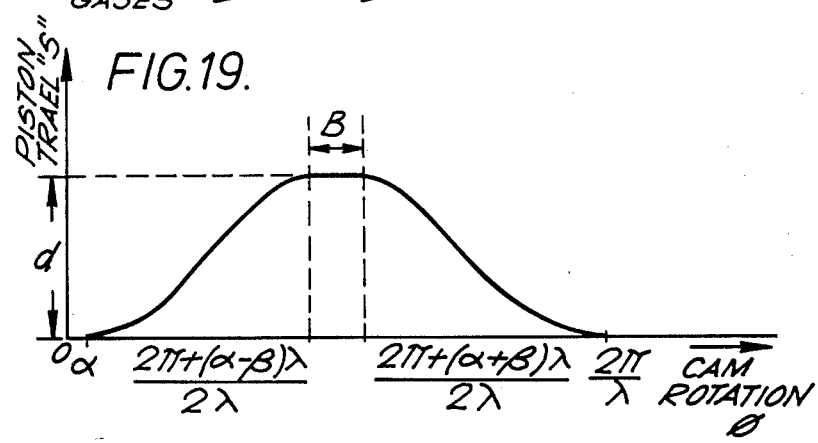
FIG. 19 is another graph illustrating piston dwell.

The more general case where the dwell period is not the same at each end of the piston stroke is represented graphically in FIG. 19. The above equation 1 may again be used to describe the piston displacement, with the following values of "ω":

for $0 \leq \phi \leq \alpha$   $\omega = 0$.

for $\alpha \leq \phi \leq \dfrac{2\pi + (\alpha + \beta)\lambda}{2\lambda}$   $\omega = k(\phi - \alpha)$ for $\dfrac{2\pi + (\alpha + \beta)\lambda}{2\lambda} \leq \phi \leq \dfrac{2\pi + (\alpha + \beta)\lambda}{2\lambda}$   $\omega = \pi$ for $\dfrac{2\pi + (\alpha + \beta)\lambda}{2\lambda} \leq \phi \leq \dfrac{2\pi}{\lambda}$   $\omega = k(\phi - (\alpha + \beta))$ where
α = dwell period (radians) at one end of the piston stroke
β = dwell period (radians) at the other end of the piston stroke and $k = \dfrac{2\pi\lambda}{2\pi - \lambda(\alpha + \beta)}$ It will be appreciated that if desired the shape of the cam 17 could be changed so as to provide non-equal dwells at opposite ends of the cylinders.

The invention provides an engine with the following advantages:

(1) Causing substantial dwell of the pistons 10 at T.D.C. while combustion of air/fuel mixture is taking place, enables the engine 1 to operate on a constant volume heat addition cycle. This cycle is more efficient than the thermodynamic cycle of conventional engines, which only approximate to the constant volume heat addition cycle.

(2) Delaying the pistons 10 substantially at B.D.C., during which period exhaust ports 8 remain fully open, results in efficient scavenging of the exhaust gases out of the cylinders 2.

(3) Since the pistons 10 are delayed at B.D.C. at maximum exhaust ports (8) area, the exhaust port height is reduced. This allows a substantially complete expansion of the gas in the cylinder which imparts extra effort to the drive shaft 15. Since the flow of exhaust gases out of the cylinder requires a finite time, conventional engines uncover the exhaust ports too early, resulting in incomplete expansion of gases in the cylinders and therefore reduction in power output, with an increase in specific fuel consumption.

As mentioned above, the engine 1 operates as a constant volume, heat addition cycle. That is, a thermodynamic cycle in which a substantial amount of heat is added to the combustion air whilst that air is held at substantially at constant volume. Conventional engines approximate the constant volume heat addition cycle and employ a piston kinetically connected to a crankshaft in such a way that the volume of burning gas changes during combustion. In the case of the present invention, the volume of the compressed air stays substantially constant during combustion. This results from piston dwell.

Figure 11:
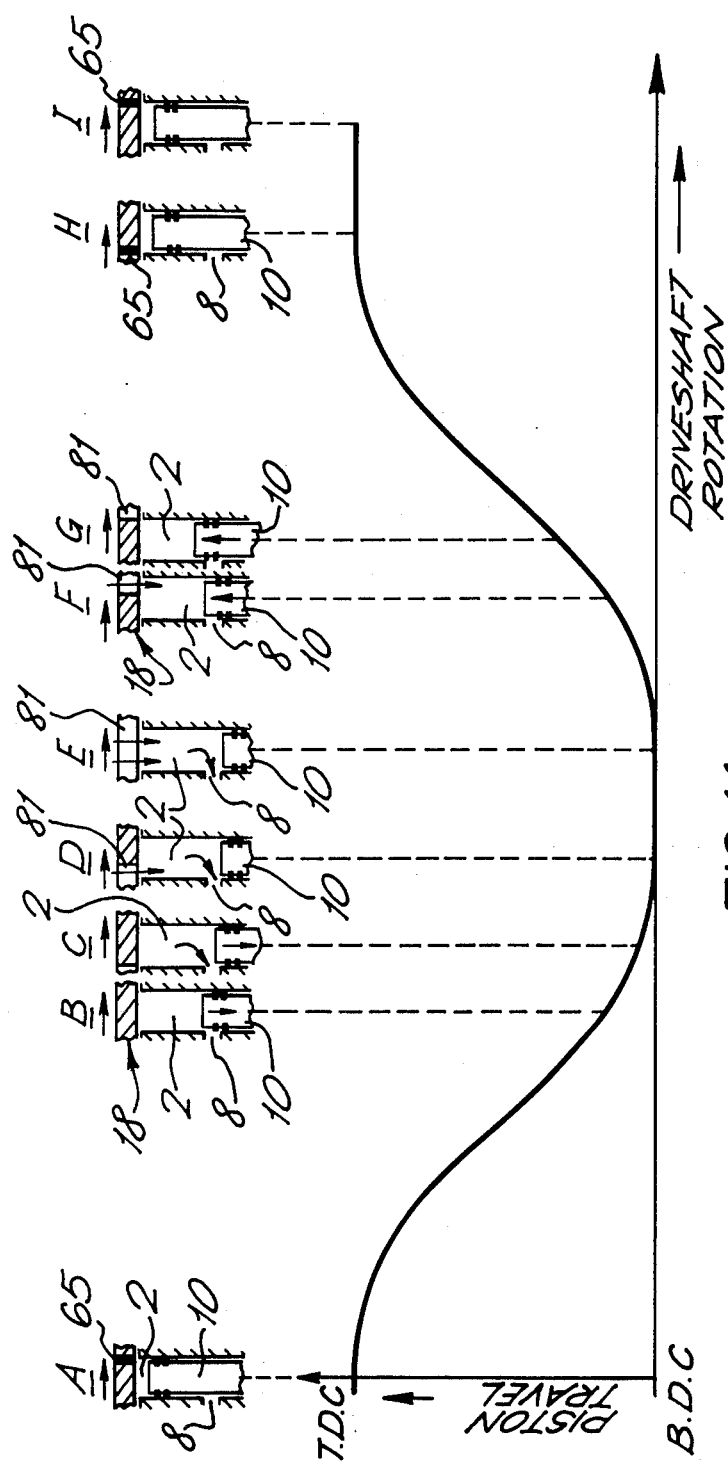
FIG. 11 illustrates operation of the engine during its working strokes.

Use of the invention is not confined to compression-ignition engines. Engine 1 may alternatively be provided with ignitors and used as a spark-ignition engine. In this case the arcuate combustion chamber 11 of a piston 10 is best replaced by a hemi-spherical form of combustion chamber formed in the piston top. Fuel injection is then caused to take place when the modified piston 10 travels between stages G and H (FIG. 11). As the piston 10 reaches T.D.C., the associated ignitor will have reached the centre of the hemi-spherical combustion chamber 11. A spark is then generated which ignites the air/fuel mixture.

In the case of the present embodiment, the ends of the pistons 10 have minimal clearance with the inner surfaces of the cylinder heads 18, combustion taking place within the chambers 11 formed within the pistons. In a modification, the piston/cylinder head 10/18 clearances are increased and the volumes of the combustion chambers 11 reduced (to nil if necessary) to provide combustion spaces.

Since the pistons 10 are delayed at T.D.C. and B.D.C. for sufficient time to allow combustion to procede, the ignition advance mechanisms of conventional spark-ignition engines are not needed. This means a simple, reliable and cheap spark-ignition system, since the electronic transducers and microprocessors needed for modern engines of this type, in order to determine the desired ignition advance curve, are no longer needed.

A suitable form of spark-ignition system, using the rotary member 16 as a distributor, can be provided.

Such a system may comprise an insulated ring of pick-up pegs (not shown) disposed around the drive shaft 15. Insulated leads disposed within the rotary member 16 are used to carry the high voltage current to the spark-ignitors.

The pegs mounted on the drive shaft 15 cooperate with stationary magnets (not shown) whereby a trigger system as used in conventional electronic ignition devices is formed.

The rotary cylinder cover plates 18 provide means for admitting fresh air and fuel into each cylinder and igniting the resulting air-fuel mixture. The admission of air, the injection of fuel, and in the case of a spark-ignition version of the engine 1, ignitor, take place in cyclic order, i.e. the induction ports 81 on the cylinder cover plate 18 admit air to each cylinder 2 in turn. Similarly the fuel injectors 65 operate with respect to each cylinder 2 in turn. The induction ports 81, injectors 65 and, in the case of a spark-ignition version of the engine, the ignitor, on each rotary cylinder cover plate 18 are independent of the number of cylinders 2. That is to say, an injector and an induction port are not required for each cylinder.

The rotary cylinder cover plates 18 provide the engine with an elegant solution to a complex problem in engine design, namely the induction of fresh air into the cylinders.

The rotary cylinder cover plates 18 may be provided with means for accelerating the flow of air through the induction ports 81. For example, flow-accelerating blades or vanes disposed in the ports 81.

The engine 1 avoids the need for a camshaft, as well as tappets and valves for each cylinder, as in conventional engines. The number of induction ports 81 formed in each rotary cylinder cover plate 18 is independent of the number of cylinders 2. This results in a more simple, reliable and cheap induction system. Each cylinder 2 achieves the same volumetric efficiency as the others, as fresh air is admitted to each cylinder on exactly the same conditions, Furthermore, a high volumetric efficiency can be achieved due to the unrestricted flow of air into the cylinders 2 and to the large induction port area which exposes the whole of a cylinder to incoming air. Rotation of the induction ports 81 as the associated cover plate 18 rotates, results in supercharging of the cylinders 2. A high volumetric efficiency results as the induction process occurs in a short period of time. Most of the incoming air does not ome into contact with the hot cylinder walls, and there is also no tendency for mixing of the exhaust gases and the incoming air.

Since all the injectors 65 operate simultaneously, each cylinder 2 receives precisely the same amount of fuel. The resulting symmetrical distribution of combustion forces as sequential combustion takes place results in a well balanced engine. Since the fuel is injected into each cylinder 2 while the associated injector 65 traverses the top of that cylinder, there is excellent mixing between the atomized fuel droplets and the air trapped with the cylinder 2. This results in efficient combustion.

By providing each piston 10 with a hemispherical combustion chamber, an even higher combustion efficiency should be achieved.

The rotary member 16, with the two rotary cylinder cover plates 18 at opposed ends is a self-equilibriating unit. This means that the stress path within the member 16 balances out the forces applied thereto, whereby substantially no significant forces are transmitted to the engine body 4.

This results in a significant reduction in the stress levels to an engine body 4, making it possible to construct the engine body 4 out of materials such as ceramics which cannot be expected to withstand high stresses, particularly in tension, but nevertheless possess a number of desirable properties such as low weight, high operating temperatures and thermal insulation capabilities. This makes the concept of an Adiabatic engine feasible. In such an engine the rotary cylinder cover plates 18 can easily be thermally insulated by two semicircular ceramic plates on each cover plate 18. The rotary member 16, which itself experiences much higher stresses than the engine body 4, can be constructed out of a single piece of high strength material to withstand these stresses. For example, forged steel machined to final tolerances. The engine 1 is substantially free from vibration, is aerodymanically clean and has only a small frontal area. Thus advantage can be taken of its low stress level body to change ways of constructing aircraft structures. Hitherto, an airframe has been built to support an engine. Now an engine can become part of the load bearing structure.

The rotary cylinder head arrangement provided by the cover plates 18 also enables the construction, assembly and maintenance of the engine 1 to be greatly simplified. This is because the engine body 4 can be split longitudinally in two halves as shown In FIGS. 2 and 3. From the construction point of view, higher tolerances of piston 10 clearance can be achieved since the bores of cylinders 2 can be drilled right through from one end, resulting in fewer construction operations and therefore lower costs.

Furthermore, the engine 1 comprises a small number of identical components.

It will be appreciated also that the engine can be scaled up in size and/or horsepower without any significant increase in comlexity.

With reference now to FIGS. 12 to 15, which illustrate an expander 110 formed within the hollow rotary member 16, and intermediate therewith, the member 16 forming part of the expander, it will be appreciated that the rotary member 16 and the intermediate shaft member 37 rotate simultaneously in the same direction, (arrow 125) but not about the same centre. It will also be appreciated that the vane 32 and the cooperating seal member 35 together form gas seal means which divide the annular chamber 42 into two zones, referred to below.

The rotary member 16 rotates about the axis 3, whereas the intermediate shaft member 37 rotates about the axis 45. As a result of this kinematic arrangement, the intermediate shaft 37 rotates slightly out of phase with respect to the rotary member 16. Thus as the member 16 rotates with constant angular velocity, the angular velocity of the intermediate shaft 37 varies slightly around ($\pm$) the constant angular velocity of the member 16. The slight discrepancy in the angular velocities of the member 16 and the intermediate shaft 37 is accommodated by a small angular rotation of the cylindrical seal 35 about its own geometric centre, as the vane 32 moves (relatively) in and out of the cylindrical seal 35 at the same time. Each of the radial seals 52 carried by the shaft member 37 comes into contact with the adjacent inner surface of the rotary member 16 $\pm 30°$ from the line of eccentricity and moves only a small distance in and out of its locating slot in the intermediate shaft 37 during the period of contact. That portion of the chamber 42 to the left of the vane 32 (as viewed in FIG. 12) progressively increases with rotation of the member 16 whereby expansion of the high pressure vapour occurs. That portion of the chamber 42 to the right of the vane 32 (as viewed in FIG. 12) progressively decreases, expelling the low pressure vapour left from the previous revolution, towards slot 33 and thus into the exhaust collector channel 30. The two portions of the chamber 42 comprise high and low pressure zones which are seperated by the vane 32 and cooperating seal member 35. The central shaft 39, which remains stationary, serves two purposes. Firstly, it locates the intermediate shaft 37. Secondly, it acts as a "rotary" valve by admitting high pressure vapour into the expansion chamber 42 formed between the intermediate shaft 37 and rotary member 16.

As shown in FIG. 12, the slot 40 in the intermediate shaft member 37 begins to traverse the slot 51 in the central shaft 39. This allows an outward flow of high pressure vapour to take place from the hollow 50 of the shaft 39 towards the expansion volume or high pressure zone on the left hand side of the vane 32. The volume on the right hand side of the vane 32 comprises the low pressure zone as it contains low pressure vapour from the expansion process which took place during the previous revolution of the shaft member 37.

In FIG. 13, the slot 40 has completely traversed the slot 51 and the flow of vapour into the high pressure zone of the chamber 42, i.e. to the left of the vane 32, is complete. Between the stages illustrated by FIGS. 12 and 13, the outward flow of high pressure vapour causes a constant pressure expansion, creating torque applied, by way of vane 32, to the rotary member 16.

Between the stages, illustrated by FIGS. 13 and 14, the vapour trapped in that portion of the chamber 42 on the left hand side of the vane 32 undergoes a polytropic expansion, continuing to apply torque onto the member 16. At the stage illustrated by FIG. 14, both the polytropic expansion and the expulsion of the low pressure vapour from the previous revolution have been completed.

With reference to FIG. 15, the vane 32 has traversed the line of eccentricity. Expulsion of the low pressure vapour is about to take place through the slot 33. Further rotation of the vane 32 causes a high pressure zone to be formed on the left hand side of the vane 32. Vapour then expands, at constant high pressure, when slots 40 and 51 again come into register with each other.

The vapour cycle illustrated by FIGS. 12 to 15 utilizes the heat energy present in the engine exhaust gases, converts this heat energy into mechanical energy through the expander 110, and applies this mechanical energy to the rotary member 16. Thus the extra power gained by the expander 110 is transferred to the rotary member 16. The engine 1 is therefore provided with auxiliary means for augmenting rotatin of the rotary member 16.

With reference to FIGS. 17 and 18, the engine exhaust gases pass from the exhaust collecting manifold 114, and then through the vapour generator 113 to the atmosphere, transferring heat energy to the working fluid (FREON), which flows through the vapour generator 113 in counterflow. The high pressure vapour leaving the vapour generator 113 is then expanded through the expander 110 of FIGS. 12 to 15 in order to create extra torque on the shaft 15. Low pressure vapor flows from the expander 110 to the regenerator 112 to the condenser 111. In the regenerator 112, heat from the low pressure vapour is reversibly transferred to the condensed fluid which is pumped by the feed pump 90, back to the vapour generator 113. The cycle is then repeated.

The cylindrical shape of the engine 1 allows the various components of the Rankine bottoming cycle to be made compact. (A bottoming cycle is a thermodynamic cycle which utilises heat energy in the exhaust stream as a heat source). Thus the vapour generator surrounds the engine 1, and the space within the hollow rotary member 16 is utilized to house the vapour expander 110.

Forming the vapour generator 113 so that it surrounds the exhaust gas outlet ports 8 makes it possible to extract the maximum heat capacity out of the exhaust gases. As the gases do not have far to travel before entering the vapour generator 113, they retain their high temperature. The vapour generator 113, by surrounding the engine 1, not only acts as a muffler but also as an effective noise suppressor as well. It also serves to utilize the pressure waves issuing from the exhaust ports 8, so as to prolong initial depressions caused by the Kadency effect, referred to above.

By constructing the vapour expander 110 so as to take advantage of rotary movement of the member 16, an ideal coupling of the primary and secondary thermodynamic cycles is achieved with only a small number of components. No gearbox is needed to transfer the work of the expander 110 to the rotary member 16, so higher efficiency and reliability can therefore be achieved than if a gearbox had been used.

The expander 110 of the engine 1 could be used as a starter motor, by using a compressed air supply.

The engine 1 may be modified for use as a compressor. In this mode, the engine 1 is devoid of such unwanted features as exhaust ports 8, fuel injectors 65 and expander 110, and the rotary member 16 may be used as the rotor of an electric motor.

The air ports 81 will need to be doubled—one set to allow atmospheric air to enter and the other in the place of the fuel injectors 65 to allow compressed air to be discharged.

Movement of the pistons 10 need not be confined to paths substantially parallel to the central axis 3. In a (non-illustrated) modification, the cylinders 2 may be disposed so that they extend radially outwards from the axis 3. The piston actuating cam may then comprise an annular member, the central axis of which coincides with the axis 3.

The engine 1 is expected to provide high torque at low R.P.M., allowing it to drive, for example, a propeller or propeller-fan without the need for a gearbox.

Calculations indicate that the engine 1 should be able to burn substantially less fuel than conventional turboshaft engines. The estimated high fuel efficiency of the engine 1 is attributed to the following factors:

1. Low frictional loses within the engine itself.
2. Delay of the pistons (10) at TDC while combustion is taking place, allowing operation of the engine on a constant volume, heat addition cycle.
3. Delay of the pistons (10) at BDC while the exhaust ports 8 are fully uncovered.
4. Higher combustion efficiency of the air-fuel mixture, due to good mixing of atomized fuel droplets and air as the fuel injectors 65 traverse the arcuate combustion chambers 11.
5. Selective actuation of the fuel injectors 65, enabling fuel to be delivered to particular cylinders 2. The engine output power can therefore be digitized and its part-load efficiency increased. By selectively switching off any cylinder 2, the engine 1 can be made to simulate the variable displacement concept. Furthermore, the great number of cylinders in the engine (24 in all) ensures a greater degree of power discretization.
6. Efficient utilization of exhaust heat energy.—By use of the compact expander 110, disposed within the rotary member 16. The arrangement also avoids the need for a gearbox.

The force exerted by a pair of rollers 26 on the surface of the cam 17 is the difference between the pressure forces in the top and bottom ends of the cylinders. This means that in a two-cycle form of the engine, the inertia forces due to the reciprocating motion of the piston mass are not transferred to the rotary member 16 because they are cushioned by the compression of air at either end of the piston. This leads to low frictional losses and a relatively long engine life.

One of the main reasons for the short life of many engine parts in a conventional engine is due to the tremendous stresses the engine encounters during combustion, This large stress is also transmitted right down the crankshaft to all other parts and extreme vibration and eventual failure may result. In the engine according to the invention, the stress pattern is completely different from that in conventional engines.

The two rotary cylinder cover plates 18 at opposite ends of the rotary member 16 transfer high combustion forces axially through the rotary member 16, not through the engine body 4. This results in a self-equilibriating stress pattern within the rotary member 16, i.e. a stress pattern which exactly balances out the forces applied to it. Therefore substantially no stresses are transferred to the engine body 4. The rotary member 16 "floats" on its bearings which do not experience any significant loadings.

In conventional engine a piston is provided with a large skirt area which absorbs side thrust imposed on the piston by the connecting cylinder. This large skirt area is also responsible for high frictional losses of the piston due to the viscous forces in the fluid film lubrication mechanism. In the engine 1, a doubleacting piston is supported by a belt of fluid film lubrication disposed between the exhaust ports 8, and thus in a cooler region of the engine. This arrangement allows air film lubrication, and/or use of linear motion bearings in this region.

A single-cylinder version of the engine may be provided.

I claim:

1. An internal combustion engine comprising at least one piston reciprocally movable within a cylinder and interconnected with a rotary member of hollow form by cam means carried by the rotary member, whereby reciprocatory movement of the piston causes rotation of the rotary member, and auxiliary means for augmenting rotation of the rotary member, said auxiliary means comprising a closed circuit pressurized vapour system including an expander disposed within the hollow rotary member and interconnected therewith, whereby mechanical energy obtained from expansion of the vapour in the expander is applied to the rotary member.

2. An engine as claimed in claim 1, wherein the hollow rotary member houses a shaft which defines with the rotary member a chamber of annular form, the hollow rotary member and the shaft disposed therein rotating eccentrically relative to each other about substantially parallel axes, and in the same direction, and sealing means cooperating with the rotary member and the shaft so as to divide the chamber into relatively high and low pressure zones as the rotary membe and the shaft rotate eccentrically.

3. An engine as claimed in claim 2, wherein the sealing means cooperating with the rotary member and the shaft comprise vane means.

4. An engine as claimed in claim 3, wherein the vane means is carried by the hollow rotary member and interfits with a sealing member of elongate form carried by the shaft, the sealing member extending along an axis substantially parallel to the longitudinal axis of the shaft and rotatable about the axis along which it extends.

5. An engine as claimed in claim 1, having means whereby the pressurized vapour system makes use of engine exhaust heat.

6. An engine as claimed in claim 5, wherein a vapour generator surrounds the engine.

7. An engine as claimed in claim 1, provided with pump means for conveying liquified vapour and operable by the rotary member.

8. An engine as claimed in claim 1, wherein the cam carried by the rotary member is profiled so as to cause the piston to dwell at least at one end of its stroke.

9. An engine as claimed in claim 1, comprising a plurality of pistons and associated cylinders, disposed around the axis of rotation of the rotary member.

10. An engine as claimed in claim 1, operable on a constant volume, heat addition cycle.

* * * * *